Oct. 23, 1923.  
R. MALCOM  
EYE PROTECTOR  
Filed Jan. 16, 1922.

1,471,562

Inventor:
Robert Malcom

Patented Oct. 23, 1923.

1,471,562

UNITED STATES PATENT OFFICE.

ROBERT MALCOM, OF CHICAGO, ILLINOIS.

EYE PROTECTOR.

Application filed January 16, 1922. Serial No. 529,632.

*To all whom it may concern:*

Be it known that I, ROBERT MALCOM, a citizen of the United States, residing in Chicago, Cook County, State of Illinois, have invented certain new and useful Improvements in Eye Protectors, of which the following, taken in connection with the drawings, is a description.

My invention relates to eye protectors of the class designed to be used by automobile drivers, shop workmen and others who require protection to the eyes from wind, dust, flying particles, etc.

One of the objects of my invention is to provide an eye protector which shall have a removable lens and a frame for holding same which shall be so constructed that a lens may be removed and replaced or a new one substituted by the adjustment of a hinge retaining member which is attached directly to the lens-holding frame, which effectively secures said hinge retaining member in closed position.

It is also an object of my invention to provide a removable flexible connecting member between the lens-holding rims which forms a nose bridge, and which may be removed and replaced as required and which may be adjusted to fit different faces, the idea being to provide an eye protector which may be so adjusted to the face of the wearer that the edges of the frames will fit closely to the face and the eyes be completely protected.

In the accompanying drawings I have illustrated what I now consider an embodiment of the essential features of the preferred form of my construction, although it is obvious that certain details thereof may be changed without departing from the spirit of my invention and in these drawings:—

Figure 1:
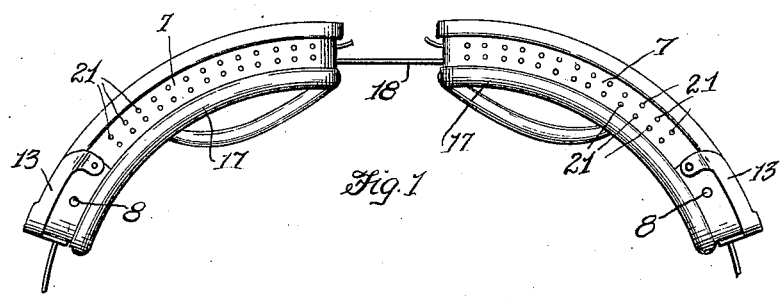
Figure 1 is a side elevation of my invention.
Figure 2:
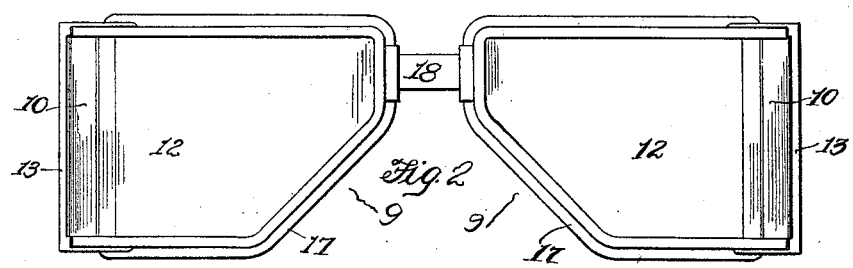
Figure 2 is a front view of the same.

Referring to the drawings, 7 indicates the lens-holding rims or frames which are preferably formed of metal, such as aluminum or the like, each of which is bent to form an eye cup, and when a pair of the cups are secured together they extend in the arc of a circle, as shown in Figure 1, each of the rims being bent in a curve extending in the direction of the length thereof.

The end members 10 are bent around the end of the frame 7 and riveted as at 8 to said frames at the sides thereof, as shown in Figure 1, to permanently hold said frames in fixed position and strengthen the corners of the structure.

These rims form elongated frames having one corner 9 of each frame bent at an angle to form, when assembled, the recessed portion for the nose of the wearer.

The depth of each lens-holding frame 7 is sufficient to permit the body of the frame to stand out and away from the face with one edge only of the rim coming in contact therewith.

The outer end 10, of each rim 7, has a recessed or cut away portion extending the entire width of the lens-holding member, and a groove 11 is formed in the outer or forward edge of said rim, the ends of said groove terminating in each rim at the recessed or cut away end 10 of the rim. The lenses 12—12 are bent to the form of the lens-holding rims and are inserted in place by following the groove from each outer end 10 of the lens-holding rims.

Movably attached to each lens-holding rim at the outer end thereof is a lens-retaining member 13, which is preferably pivotally attached to each side of the lens-holding rim 7, the pivots securing the same extending through the ends of the members 10 and the sides of the frame 7 as shown in Figure 1. This retaining member being movably attached to the sides of the lens-holding rim is adapted to be raised and lowered over the end 10 of the lens-holding rim, after the lens 12 has been inserted in the groove 11, holding the lens against displacement.

A slot 14 is cut through the central portion of the retaining member and a corresponding slot 15 is formed in the end member 10 of the lens-holding rim. After the lens is placed in the groove 11 and the retaining member 13 moved to closed position a head band 16, which may be of elastic, tape, leather or any suitable material, is extended through both slots 14 and 15, the end thereof is hemmed or knotted or otherwise constructed to form a thickened portion which will not pass through the slots 14 and 15. This forms a ready and easy adjustment for the head band, and securely holds the retaining member 13 in closed position, but leaves it so that the retaining member 13 may be raised, the band 16 sliding through the slot 14, whenever it is necessary to change the lens, but prevents the withdrawal of the head band through the slots in the outward direction.

The inner or rear edges of the rims 7 are covered with a binding 17, of any suitable material, in this case a tubular rubber which has been slit and encloses the edge of the rim 7, which may be cemented or stitched in place, holes being punched through the rim for the purpose of stitching therethrough if the binding is attached in this way. I contemplate the use of fabric binding instead of rubber where such a binding is desirable, although for sanitary purposes a non-absorbent binding is more practical for ordinary use.

Figures 3, 4, 5:
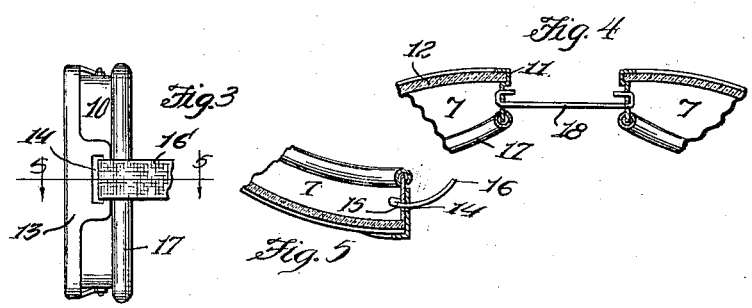
Figure 3 is an end view of one of the lens-retaining rims.
Figure 4 is a fragmentary, central, sectional detail illustrating the attachment of the flexible nose bridge.
Figure 5 is a sectional detail taken on line 5—5 of Figure 3.
Figure 6:
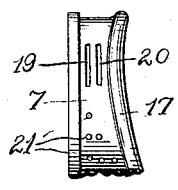
Figure 6 is a fragmentary detail of a portion of one of the lens-holding rims illustrating the nose bridge holding portions of said rims.

A flexible nose bridge 18 is provided for these eye protectors which may be of any suitable material, such as leather. Through each lens-holding rim, at a point I shall term the inner end of the rim, being that part of the rim which is adjacent the nose of the wearer, are two parallel slots 19—20 (Fig. 6). Through these slots extend the opposite ends of the flexible nose bridge 18. In assembling these eye protectors the nose bridge, 18, is laced through the slot 19 and then through slot 20 leaving each end thereof free as shown more particularly in Figures 1 and 4. This nose bridge may be adjusted to draw the lens-holding rims closer together or expand the rims wider apart to fit different faces as required; this form of nose bridge lending itself readily to such an adjustment.

Through the sides of the lens-holding rims 7 are provided a plurality of apertures 21, which are designed for purposes of ventilation.

I claim:—

1. An eye protector comprising a pair of lens-holding frames, each of which is bent to form an eye cup curved in the direction of the length thereof and having a groove formed therein to receive the lens, an end member movably attached to each frame and folding over the end of the lens to hold the same in position, said end member having a slot therein registering with a corresponding slot in the lens holding frame, and a head band, one end of which extends through the aforesaid slots in each eye protector.

2. An eye protector comprising a pair of lens-holding frames each of which is provided with a lens-holding groove, lenses therein, a retaining member movably attached to the outer end of each frame and folding over the end of the lens to hold the same in place, said retaining member having a slot registering with a corresponding slot in the lens-holding frame, and a head band having the ends thereof engaged through the aforesaid slots in each eye protector.

3. An eye protector comprising a pair of lens-holding frames, each of which is provided with a lens-holding groove on two sides and one end thereof, a lens fitting within said groove, the outer end of said frame being recessed to a point directly below said groove, the retaining member pivotally attached to each frame and folding over the end of the frame and the lens therein, said retaining member having a slot registering with a corresponding slot in the end of the lens-holding frame, a head band having one end thereof engaged through the registering slots in each eye protector, and a flexible nosepiece uniting the two lens-holding frames.

4. An eye protector comprising a pair of elongated lens-holding frames curved in the direction of the length thereof, each of said frames having a groove formed near one edge thereof, lenses in said grooves, end retaining members movably secured to the sides of said frames and extending across the ends thereof, the pivoted ends of said retaining members being curved to fit over the grooved portion of the frame and permit the ends thereof to be attached mediate the edges of said frame, and a flexible removable nosepiece having connection with the lens-holding frames.

5. An eye protector comprising a pair of elongated lens-holding frames, each having a groove extending around one edge thereof, lenses in said grooves, end retaining members movably secured to the sides of said frames and extending across the ends thereof, the ends of said retaining members being curved to conform to the sides of the lens-holding frames, attaching means securing said retaining members to the frames mediate the edges of said frames, the retaining members having slots formed therein coincident with slots formed in the ends of said frames, a headband having the ends thereof extending through each pair of coincident slots, and a flexible nosebridge connecting the pair of frames together.

6. An eye protector comprising in combination a pair of metal lens-holding frames, lenses therein, each of said frames having parallel slots cut therethrough in the nosebridge end of the frames, a flexible nosebridge for the ends thereof laced through the aforesaid slots to connect the pair of frames together, lenses in said frames, movable lens-retaining members attached to said frames and folding over the end of each frame and lens, said retaining members and the outer ends of each frame having coincident slots therein, and a headband having the ends thereof extending through said slots.

7. An eye protector comprising in combination a pair of metal lens-holding frames each having grooves formed therein, a lens seated in said groove in each frame, a movable retaining member secured to the outer end of each frame and having a slot therethrough which overlaps a corresponding slot through the end of the lens-holding frame, a headband extending through each pair of said slots and having means formed on the end thereof to prevent removal therefrom in one direction, and an adjustable nosepiece connecting said frames together.

8. An eye protector comprising in combination a pair of metal lens-holding frames each having a groove formed therein, a lens in said groove, a movable member abutting against the outer end of each lens, a head band, the ends of which pass through coincident slots in each movable member and the end of the lens-holding frame, and means formed on the ends of said headband to prevent its withdrawal through the slots in one direction and a flexible adjustable nosepiece connecting the inner ends of the lens-holding frames by being laced through slots cut through the metal frames.

9. An eye protector comprising a pair of lens-holding frames, the ends of the outer end members of said frames being bent parallel with the sides of the frame, means for securing said end members to the frame, lenses in said frame, a lens-retaining member having movable engagement with the sides of the frame and adapted to fold over the end of the lens holding frame, and detachable means for holding the retaining member, the frame and the lens in fixed position.

In testimony whereof I have signed this specification.

ROBERT MALCOM.